United States Patent [19]
Cheng

[11] Patent Number: 5,953,933
[45] Date of Patent: Sep. 21, 1999

[54] WATER CONTAINER AND COOLING FAN ASSEMBLY

[76] Inventor: Chuan-Hsin Cheng, Room 11, 7F., No. 16, Lane 609, Sec. 5, Chung Hsin Rd., Sanchung City, Taipei Hsien, Taiwan

[21] Appl. No.: 08/815,707

[22] Filed: Mar. 12, 1997

[30] Foreign Application Priority Data

May 17, 1996 [TW] Taiwan .................................. 85207331

[51] Int. Cl.$^6$ ....................................................... F25D 17/06

[52] U.S. Cl. ............................... 62/425; 62/420; 62/457.2

[58] Field of Search .................................... 62/259.1, 419, 62/420, 421, 424, 425, 457.2, 530, 529

[56] References Cited

U.S. PATENT DOCUMENTS

| | | | |
|---|---|---|---|
| 1,972,231 | 9/1934 | Malm et al. | 62/420 |
| 2,564,998 | 8/1951 | Sayers | 62/425 |

*Primary Examiner*—John M. Sollecito
*Attorney, Agent, or Firm*—Varndell Legal Group

[57] ABSTRACT

A water container and cooling fan assembly including a fan motor base, a cylindrical housing mounted on the fan motor face and covered with a top cover, and a water container put inside the housing, the water container having a plurality of longitudinal turning angles defining with the housing a plurality of longitudinal wind passages through which induced currents of air from a fan in the fan motor base pass, top cover having a smoothly curved wind guide face on the inside adapted for guiding induced currents of air from the longitudinal wind passages to an exhaust port.

1 Claim, 6 Drawing Sheets

WATER CONTAINER AND COOLING FAN ASSEMBLY

BACKGROUND AND SUMMARY OF THE INVENTION

The present invention relates to a water container and cooling fan assembly which comprises a housing covered with a top cover to hold an icy water container, and a fan motor base mounted on the housing at the bottom and controlled to cause upward currents of air for carrying cold temperature out of the housing through an exhaust port on the top cover for cooling for example the user.

FIG. 1 shows a miniature electric fan for personal use for causing currents of air for cooling. However, the currents of air induced by this kind of electric fan can not make one feel really cool because the temperature of the currents of air is maintained equal to the ambient temperature.

The present invention provides a water container and cooling fan assembly which produces cold currents of air for cooling. According to one aspect of the present invention, the water container and cooling fan assembly comprises a fan motor base holding a fan motor and a fan for causing upward currents of air, a cylindrical housing mounted on the fan motor face and covered with a top cover, and a water container put inside the housing and adapted for holding icy water and ice blocks. When the fan motor is started, the fan is turned to cause currents of air, and induced currents of air are forced to flow over the periphery of the water container and then to be guided out of the top cover through an exhaust port thereof. According to another aspect of the present invention, the water container has a plurality of longitudinal turning angles defining with the housing a plurality of longitudinal wind passage through which induced currents of air pass; the top cover has a smoothly curved wind guide face on the inside adapted for guiding induced currents of air from the longitudinal wind passages to the exhaust port.

DETAILED DESCRIPTION OF THE PREFERRED EMBODIMENT

Figure 1:
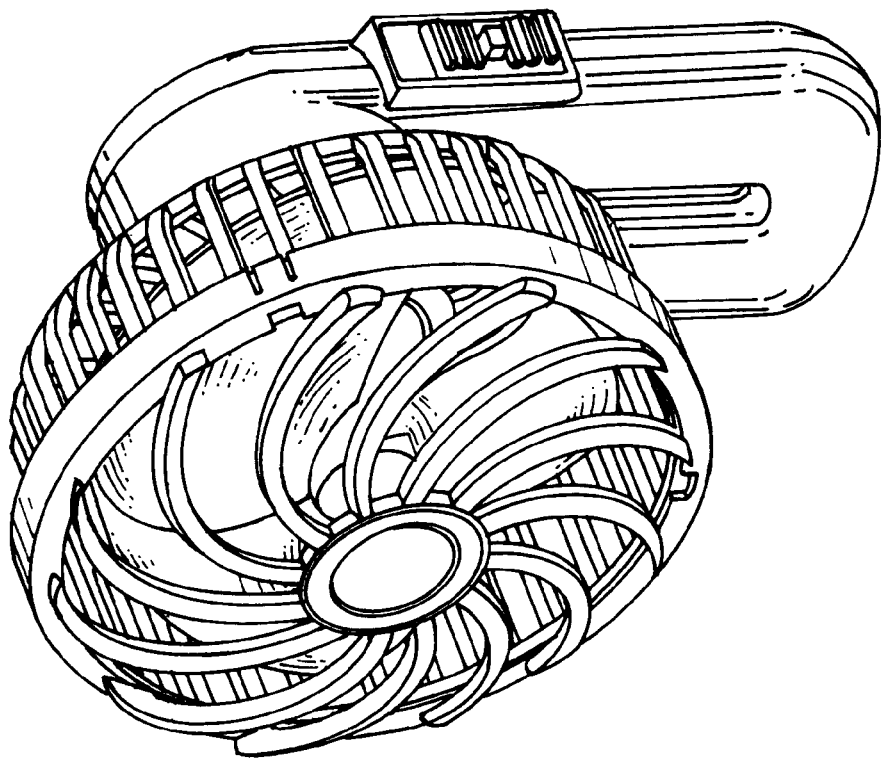
FIG. 1 is a palm-top miniature electric fan according to the prior art.
Figure 2:
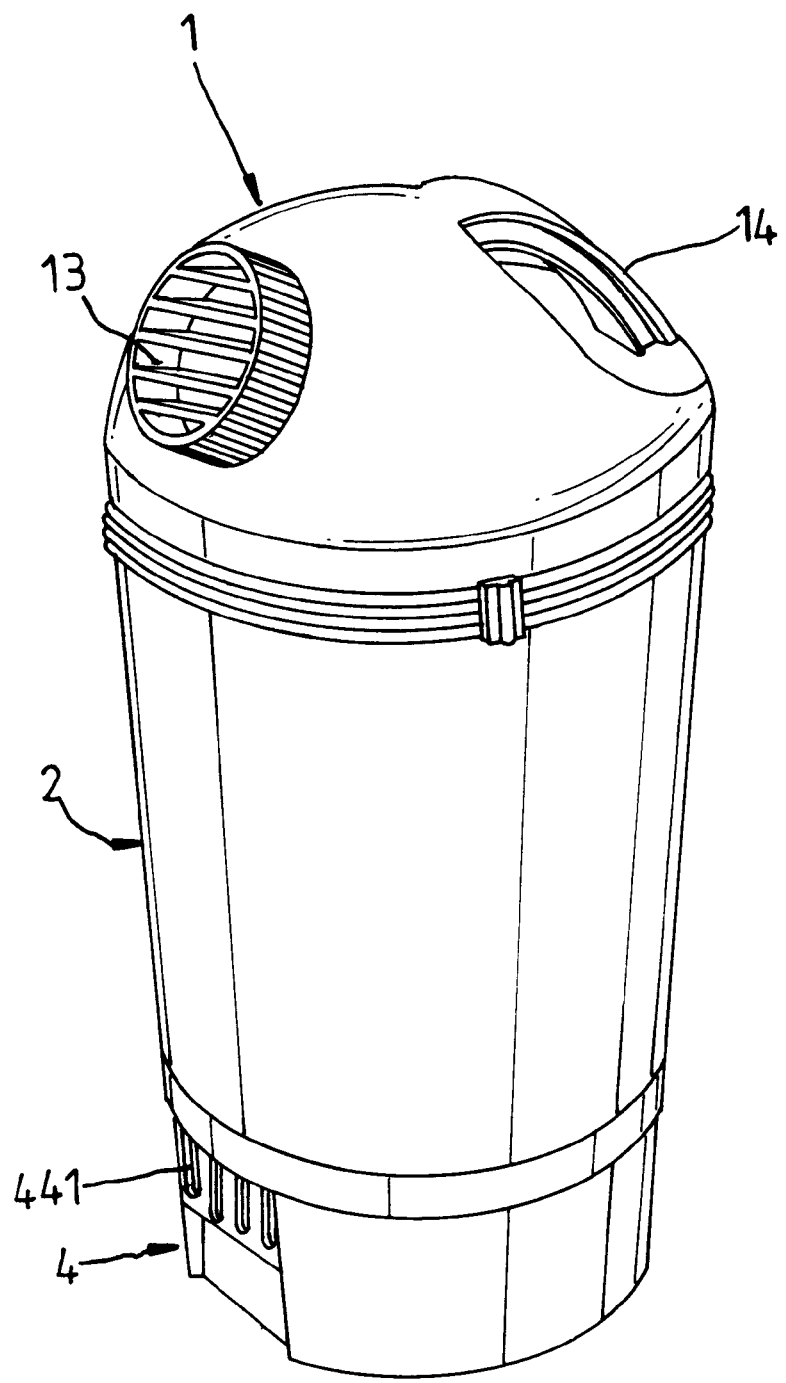
FIG. 2 is an elevational view of a water container and cooling fan assembly according to the present invention.
Figure 3:
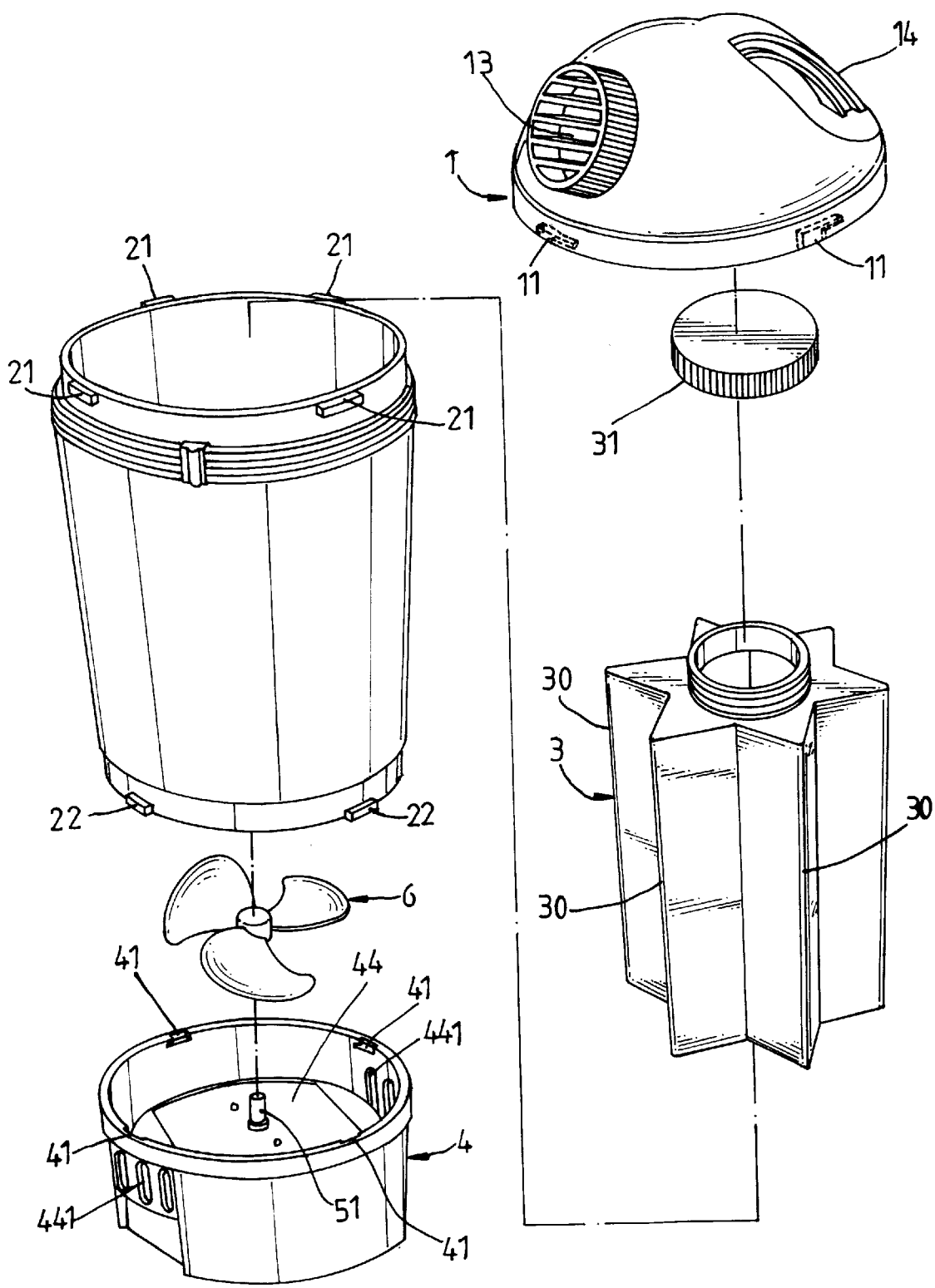
FIG. 3 is an exploded view of the water container and cooling fan assembly shown in FIG. 2.

Referring to FIGS. 2 and 3, a water container and cooling fan assembly in accordance with the present invention is generally comprised of a top cover 1, a thermo-insulative housing 2, a water container 3, a fan motor base 4, a fan 6.

Figure 4:
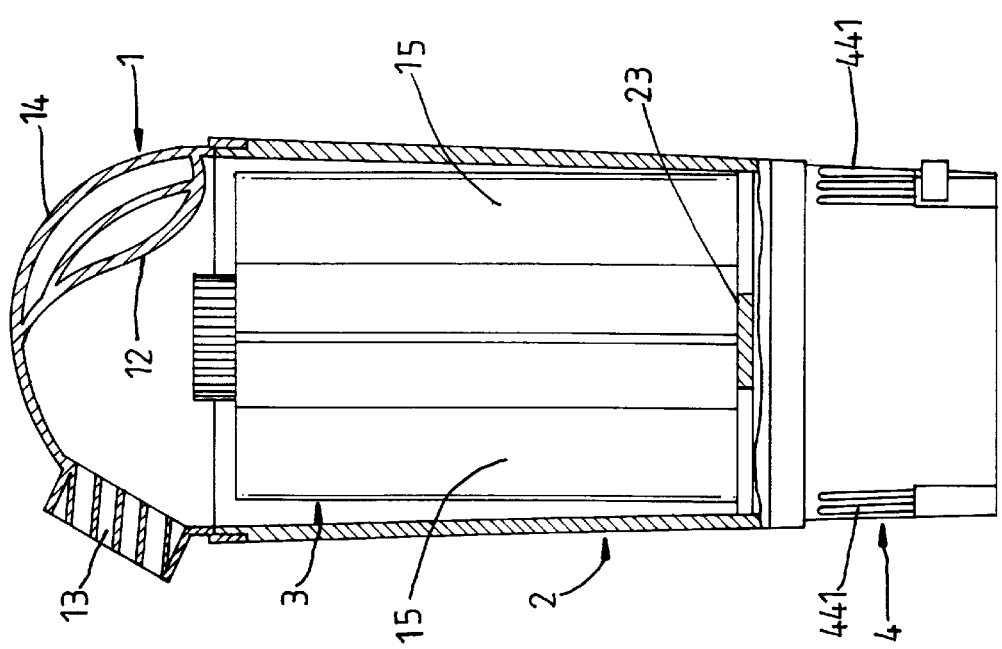
FIG. 4 is a side view in section of the water container and cooling fan assembly shown in FIG. 2.

Referring to FIG. 4 and FIG. 3 again, the top cover 1 is to be covered on the housing 2 at the top, comprising a plurality of coupling grooves 11 on the inside near the bottom, and exhaust port 13, a smoothly curved wind guide face 12 defined on the inside and adapted for guiding currents of air from the housing 2 toward the exhaust port 13 (see FIG. 4), and a handle 14 at the top for carrying by hand.

Referring to FIGS. 3 and 4 again, the housing 2 base a cylindrical shape, a plurality of top coupling blocks 21 raised around the periphery near the open top side thereof and adapted for coupling to the coupling grooves 11 of the top cover 1, a plurality of bottom coupling blocks 22 raised around the periphery near the open bottom side thereof and adapted for coupling to the fan motor base 4, and a plurality of intersected ribs 23 horizontally suspended within the open bottom side and adapted for carrying the water container 3 within the housing 2.

Referring to FIGS. 3 and 4 again, the water container 3 is mounted within the housing 2 and carried on the intersected ribs 23, having a top cap 31 and a plurality of longitudinal turning angles 30. When the top cap 31 is detached from the water container 3, water can be filled into the water container 3. When the water container 3 is put in the housing 2, a plurality of longitudinal wind passages 15 are defined between the outside wall of the water container 3 and the inside wall of the housing 2 and separated by the turning angles 30.

The fan motor base 4 comprises a plurality of top coupling grooves 41 adapted for coupling to the bottom coupling blocks 22 of the housing 2 respectively, a bottom battery chamber 42 covered with a battery lid 43 and adapted for holding a battery (not shown), a recessed top chamber 44, a fan (not shown) mounted on the inside and having a motor shaft 51 projecting into the recessed top chamber 44, and a plurality of drain holes 441 adapted for guiding carrying water away from the recessed top chamber 44. The fan 6 is coupled to the motor shaft 51 and suspending in the recessed top chamber 44 of the fan motor base 4.

Figure 5:
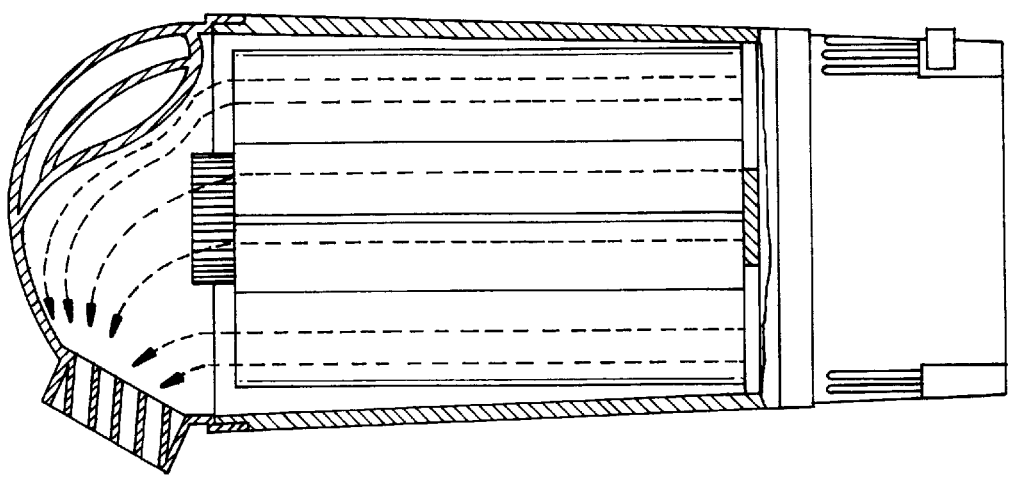
FIG. 5 is an applied view of the present invention, showing currents of air guided to the exhaust port of the top cover.
Figure 6:
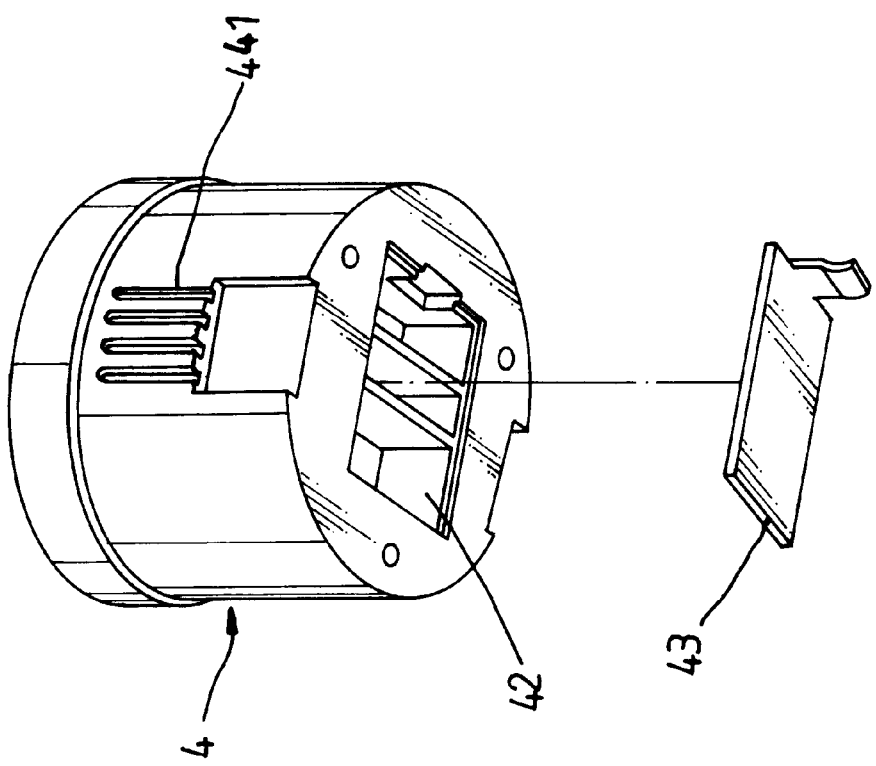
FIG. 6 shows the bottom structure of the fan motor base according to the present invention.

Referring to FIGS. 5 and 4 again, when in use, the water container 3 is filled up with icy water and ice blocks and then put inside the housing 2, then the housing 2 is mounted on the fan motor base 4 by forcing the bottom coupling blocks 22 of the housing 2 into engagement with the top coupling grooves 41 of the fan motor base 4, and then the top cover 1 is covered on the housing 2 by forcing the coupling grooves 11 of the top cover 1 into engagement with the top coupling blocks 21 of the housing 2. When the motor of the fan motor base 4 is turned on, the fan 6 is turned to cause upward currents of air which immediately pass through the longitudinal wind passages 15 and are then guided out of the exhaust port 13 of the top cover 1 by the smoothly curved wind guide face 12 for cooling for example the user. Further, the icy water of the water container 3 is drinkable.

I claim:

1. A water container and cooling fan assembly comprising:
   a fan motor base, said fan motor base comprising a plurality of top coupling grooves, a recessed top chamber, a fan motor mounted on the inside and having a motor shaft projecting into said recessed top chamber, a bottom battery chamber covered with a battery lid to hold a battery for providing electric power supply to said fan motor, and a plurality of drain holes adapted for guiding carrying water away from said recessed top chamber;
   a fan coupled to said motor shaft of said fan motor and turned by it in said recessed top chamber of said fan motor base;
   a cylindrical housing mounted on said fan motor base above said recessed top chamber, said housing comprising a plurality of bottom coupling blocks respectively coupled to the top coupling grooves of said fan motor base, an open top side, an open bottom side, a plurality of intersected ribs horizontally suspending in said open bottom side, and a plurality of top coupling blocks raised around the periphery near said open top side;

a water container carried on said intersected ribs within said housing and adapted for holding icy water and ice blocks; and a top cover covered on the open top side of said housing, said top cover comprising an exhaust port through which induced currents of air from said fan pass, a plurality of coupling grooves respectively coupled to the top coupling blocks of said housing, and a handle for carrying by hand;

wherein said top cover comprises a smoothly curved wind guide face on the inside adapted for guiding induced currents of air from said fan toward said exhaust port; said water container comprises a plurality of longitudinal turning angles defining with said housing a plurality of longitudinal wind passages through which induced currents of air from said fan pass.

* * * * *